United States Patent [19]
Bratt et al.

[11] Patent Number: 5,545,896
[45] Date of Patent: Aug. 13, 1996

[54] OPTICALLY IMMERSED SEMICONDUCTOR PHOTODETECTORS

[75] Inventors: Peter R. Bratt, Goleta; David R. Nelson, Santa Barbara, both of Calif.

[73] Assignee: Santa Barbara Research Center, Goleta, Calif.

[21] Appl. No.: 267,335

[22] Filed: Jun. 28, 1994

[51] Int. Cl.$^6$ ........................................ G01J 5/08
[52] U.S. Cl. .................... 250/338.4; 250/338.1; 250/353
[58] Field of Search ................ 250/338.4, 353, 250/338.1

[56] References Cited

U.S. PATENT DOCUMENTS

| | | | |
|---|---|---|---|
| 2,964,636 | 12/1960 | Cary | 250/211 |
| 2,994,053 | 7/1961 | De Waard | 338/18 |
| 4,425,504 | 1/1984 | Turnbull et al. | 250/353 |
| 4,629,892 | 12/1986 | Carmichael et al. | 250/353 |

OTHER PUBLICATIONS

R. Clark Jones, "Immersed Radiation Detectors", *Applied Optics*, vol. 1, No. 5, Sep. 1962.
Slawek, Joseph E. Jr., et al, "Letter to the Editor", *Infrared Physics*, vol. 15, 1975, pp. 339–340.

*Primary Examiner*—Constantine Hannaher
*Attorney, Agent, or Firm*—W. C. Schubert; W. K. Denson-Low

[57] ABSTRACT

Optical immersion of a semiconductor photodetector to a plano-convex lens is obtained with a spring arranged to urge the photodetector to abut the lens. To facilitate alignment of the detector and the lens, the spring defines, in one embodiment, a convex surface to abut a substrate that carries the detector. In another embodiment, alignment is facilitated by a ball positioned between the spring and the substrate. Optical noise is reduced by a dielectric between the detector and the lens, with the dielectric thickness less than $\frac{1}{10}$ of any radiation wavelength of interest.

18 Claims, 3 Drawing Sheets

OPTICALLY IMMERSED SEMICONDUCTOR PHOTODETECTORS

BACKGROUND OF THE INVENTION

1. Field of the Invention

The present invention relates generally to radiation detectors and more particularly to semiconductor photodetectors.

2. Description of the Related Art

Optically immersed radiation detectors have a detector element that is placed in optical contact with a lens that preferably has a high index of refraction. The term of art used to describe the detector element optically contacting the lens is that the detector element is "immersed to" the lens. Elimination of intervening materials, e.g., air, that have a lower refraction index permits the lens to image a greater solid angle of incident radiation onto the detector element. In immersed radiation detectors, the lens acts as the final optical unit that collects radiation for the detector element.

The performance gain of optically immersed detectors was analyzed and reported in R. Clark Jones, "Immersed Radiation Detectors", *Applied Optics*, Vol. 1, No. 5, September 1962. This paper investigated the gain due to immersion when the detection system is in the presence of externally and internally generated noise.

U.S. Pat. No. 2,964,636 was directed to optically immersed photoconductive cells that were formed by deposition of a lead sulfide or lead selenide photosensitive film on one surface of an imaging lens, e.g., on the flat surface of a plano-convex lens.

Experiments with the immersion of photodetectors with hemispherical germanium lenses were conducted and reported by Slawek, Joseph E. Jr., et al, "Letter to the Editor", *Infrared Physics*, Vol. 15, 1975, pp. 339–340. These experiments were specifically directed to photoconductive detectors formed with the compound semiconductor HgCdTe (mercury-cadmium-telluride) and demonstrated a loss in radiation responsivity when bonding adhesives were introduced between the photoconductive detector and the lens.

SUMMARY OF THE INVENTION

The present invention is directed to the optical immersion of a semiconductor photodetector to a lens without introducing optically significant materials therebetween.

This goal is achieved by urging the lens and photoconductor together with the restoring force of a spring. In a preferred embodiment, the detector is supported by a substrate and the substrate is abutted with a convex surface of the spring to facilitate alignment of the detector and lens. In another preferred embodiment, the substrate is abutted with a spherical surface of the spring to facilitate the alignment. In yet another preferred embodiment, a ball is introduced between the spring and the substrate to facilitate the alignment.

Detection noise is reduced by spacing the detector and the lens apart with a dielectric having a refractively insignificant thickness, i.e., a thickness less than ½ of any radiation wavelength of interest and, more preferably, less than 1/10 of any radiation wavelength of interest.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
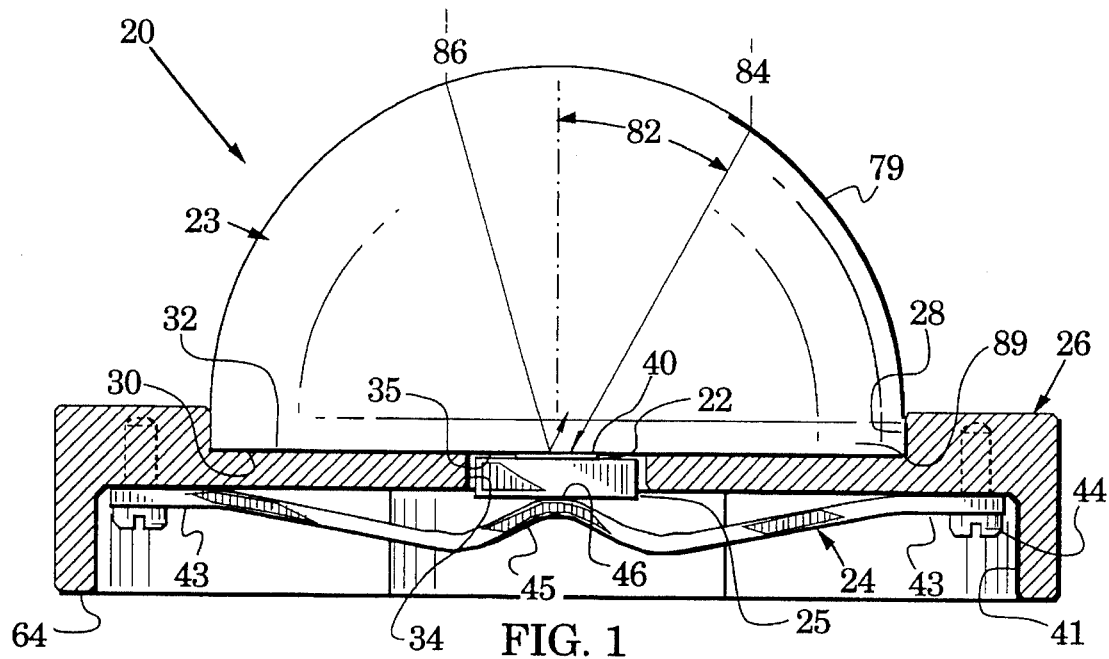
FIG. 1 is a sectioned side elevation view of a preferred immersed semiconductor photodetector embodiment in accordance with the present invention.
Figure 2:
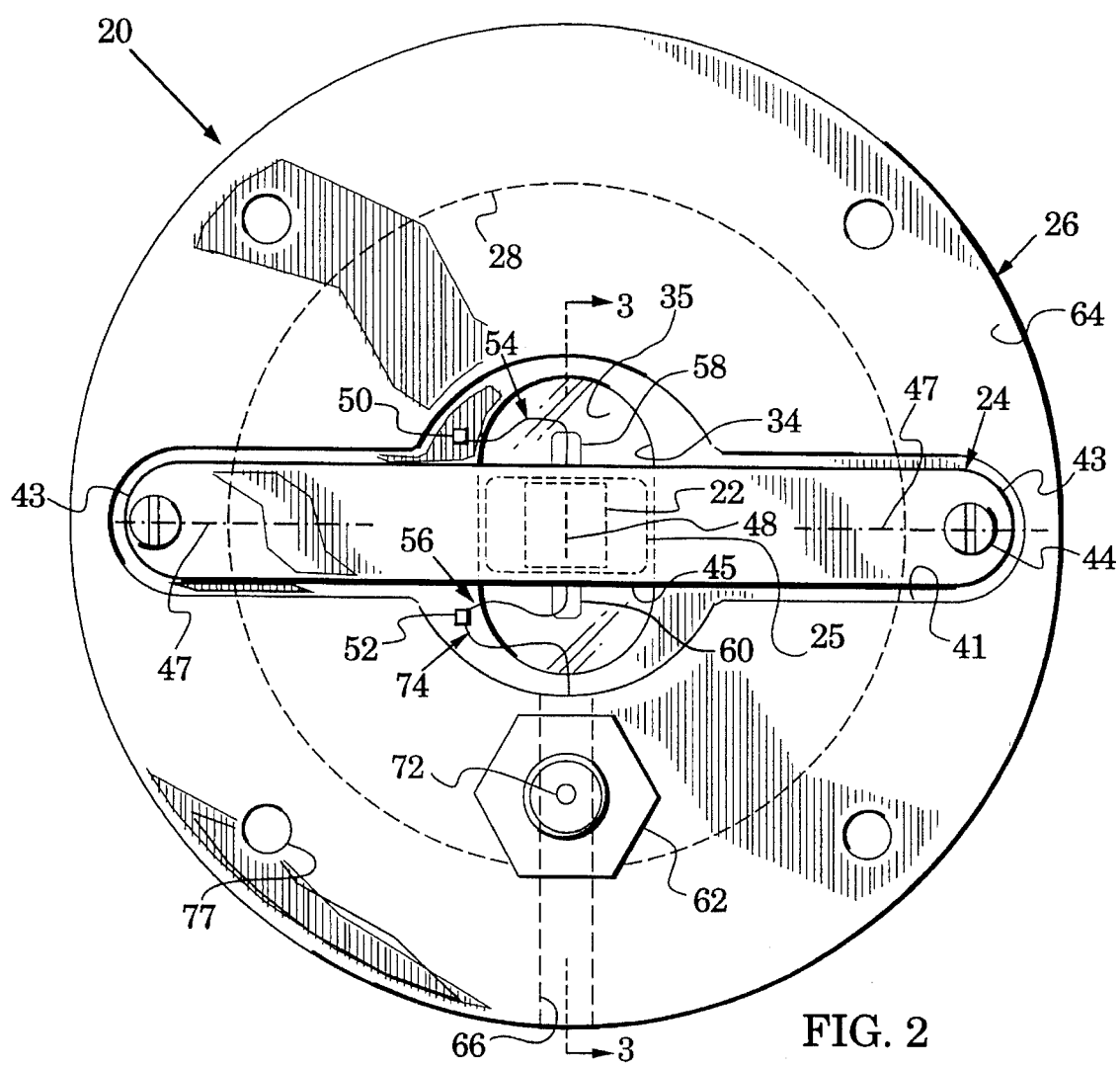
FIG. 2 is a bottom plan view of the embodiment of FIG. 1.
Figure 3:
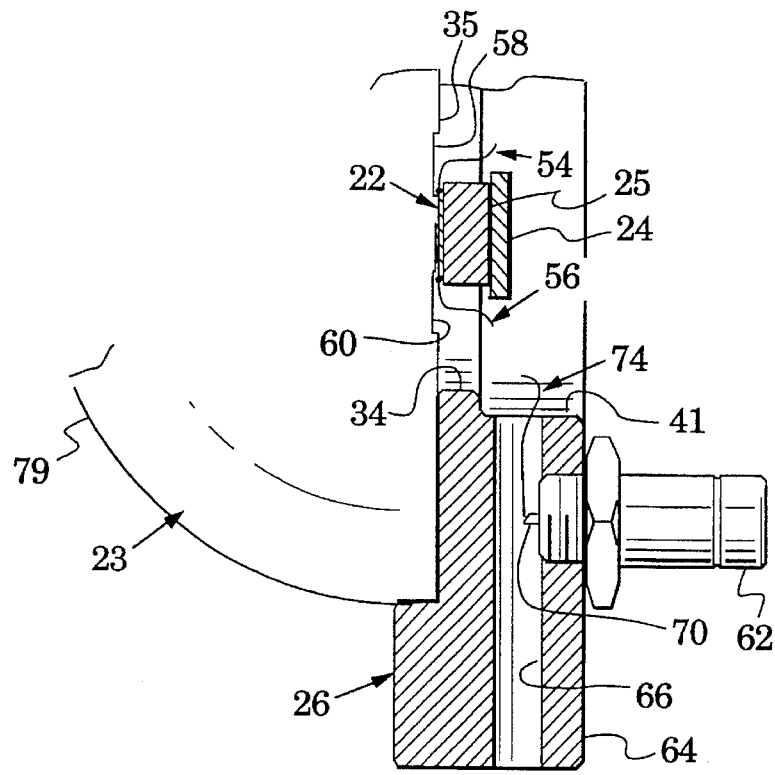
FIG. 3 is a view along the plane 3—3 of FIG. 2.

Illustrated in FIGS. 1–3 is a preferred immersed semiconductor photodetector embodiment 20 in accordance with the present invention. FIGS. 1 and 2 are respectively a sectioned side elevation view and a bottom plan view of the embodiment 20 and FIG. 3 is a view along the plane 3—3 of FIG. 2. The structure shown in these figures optically immerses a semiconductor photoconductive detector 22 to a plano-convex lens 23 with the aid of a resilient spring 24. The restoring force of the spring 24 urges the detector 22 into optical contact with the lens 23 without intervening materials so that the lens acts as the final optical unit that collects radiation for the detector.

Photoconductive detectors formed of a compound semiconductor, e.g., HgCdTe (mercury-cadmium-telluride), tend to be quite fragile and are, therefore, typically carried on a substrate. A preferred substrate is formed of a material that has a high thermal conductivity to facilitate removal of heat from the photoconductive detector and that has a coefficient of thermal expansion close to that of the detector to facilitate its attachment to the substrate with an adhesive. For example, sapphire is typically used as a substrate for HgCdTe semiconductor detectors. Accordingly, in FIGS. 1–3, the detector 22 is physically carried on a substrate 25.

The embodiment 20 includes a mount 26 that forms a recess 28 which is configured to closely receive the plano-surface 30 of the lens 23. The lens 23 is secured in the recess 28 with an appropriate adhesive 32. The mount 26 also forms a window 34 that exposes a medial portion 35 of the plano-surface 30. The detector 22 and substrate 25 are positioned within the window 34 with the upper face 40 of the detector 22 in contact with the medial lens portion 35.

The mount 26 further forms a chamber 41 that communicates with the window 34 and has a depth sufficient to accommodate the spring 24. The spring 24 is configured with a compound curve and is attached at each end 43 to the mount 26 with a fastener in the form of a screw 44. The spring's center portion 46 abuts the substrate 25 and urges the substrate upward to cause the detector face 40 to optically contact the medial lens portion 35.

In particular, the spring's center portion 45 defines an arcuate convex surface 46 which contacts the substrate 25 along a contact line that is orthogonal to the spring's longitudinal axis 47 (the contact line is shown in FIG. 2 as the broken line 48). The term "line" as used herein refers to a contact area that is much longer that it is wide, and not to a classical line of zero width. This line contact relationship between the convex surface 46 and the substrate 25 allows the substrate and detector to rotate as required on the spring 24 to align the detector face 40 and the medial lens portion 35.

A pair of terminals 50, 52 are mounted in the chamber 40 proximate to the window 34. Wire bonds 54, 56 of the detector 22 are electrically connected respectively to the terminals 50, 52. As is best seen in FIG. 3, a pair of shallow channels 58, 60 are milled in the lens' medial portion 35 and positioned to clear the wire bonds 54, 56 as they exit the detector 22. This insures that the wire bonds 54, 56 do not prevent optical contact between the detector and the medial lens portion 35.

An electrical jack 62 is mounted on the rear face 64 of the mount 26 and a passage 66 in the mount provides access to a terminus 70 of the jack's coaxial center conductor 72. Another wire bond 74 connects the terminal 52 and the terminus 70.

In use, the embodiment 20 is positioned, e.g., with the aid of fasteners through mounting holes 77, to receive radiation onto the convex lens surface 79. A portion of this incident radiation is imaged by the lens onto the photoconductive detector 22. Photons of the radiation are absorbed in the detector 22 with consequent production of mobile charge carriers. Measurement of the increase in electrical conductivity of the detector 22, due to the generated mobile carriers, provides a measure of the radiation photon flux. The detector's conductivity can be measured, for example, by grounding the terminal 50 to the mount 26 and connecting an external resistor and voltage source serially with the detector 22 via the jack 62. Measurement of the voltage across the external resistor provides an indication of the current change due to conductivity changes in the detector 22.

In accordance with the principals of optical immersion, the refractive index of the lens 23 is preferably chosen to closely match that of the detector 22. For example, a germanium lens 23 of refractive index~4 may be chosen to be in optical contact with a detector 22 formed of the compound semiconductor HgCdTe which has a refractive index~3.6. Then, in accordance with Snell's Law, radiation will exit the lens 23 and strike the detector 22 if its angle of incidence 82 (see FIG. 1) with the detector face 40 is less than a critical angle equal to $\sin^{-1}$ (3.6/4)=64°. In this case, all radiation rays, such as the exemplary ray 84, that are imaged by the lens 23 towards the detector face 40 will cross the plano surface 30 and strike the detector 22 if their angle of incidence is less than 64°.

In contrast, if air or an adhesive having a low refractive index, e.g., ~1, were allowed to intrude between the lens plano surface 30 and the detector face 40, the critical angle would then be $\sin^{-1}$ (1/4)=14.5°. In this case all radiation rays, such as the exemplary ray 86, that have an angle of incidence greater than 14.5° would be reflected from the plano surface 30 and not reach the detector 22.

The high refractive index of the germanium also shortens the focal length of the lens 23, which causes more of the incident radiation to be focused onto a detector having a given face area. The plano-convex lens 23 is preferably a hyperhemispherical lens, i.e., a cylindrical portion 89 extends below the center of curvature of the convex surface 79, to further shorten the lens' focal length. The depth of the hemispherical lens, for optimal collection of incident radiation, depends upon the size of the detector and the expected solid angle of incident radiation. For example, a ray-trace analysis indicates that for a detector face (40 in FIG. 1) limited to an area of 1 square millimeter and for incident radiation up to 90° angle of incidence (82 in FIG. 1), the optimum collection of radiation will be obtained if the cylindrical portion 89 extends below the lens' center of curvature by $R/n_l$ in which R is the radius of curvature of the lens and $n_l$ is the refractive index of the lens material.

Figure 4:
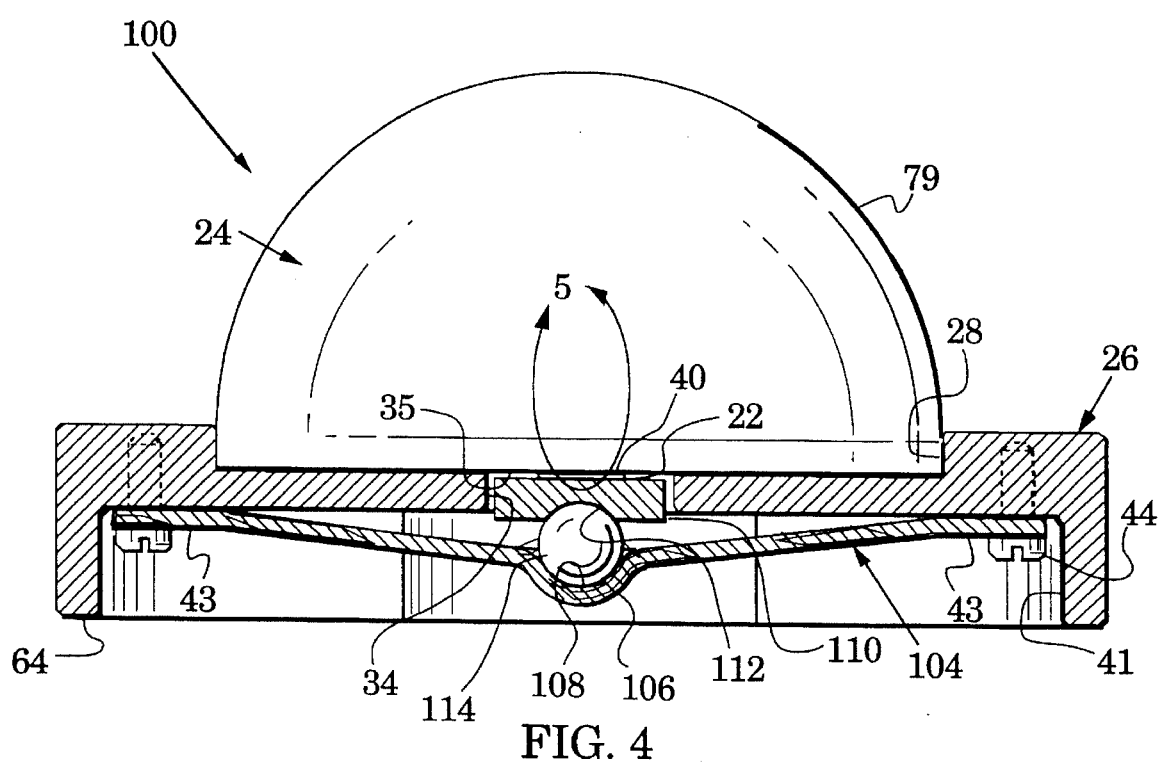
FIG. 4 is a sectioned side elevation view of another preferred immersed semiconductor photodetector embodiment.

Another preferred immersed semiconductor photodetector embodiment 100 is illustrated in FIG. 4, which is a view similar to FIG. 1 with like elements having like reference numbers. The embodiment 100 is similar to the embodiment 20 of FIGS. 1–3 but the spring 24 is replaced by a spring 104 whose center portion 106 is configured with a downward extending spherical cup 108. To better illustrate this cup, the spring 104, unlike the spring 24 in FIG. 1, is shown in section in FIG. 4. The substrate 25 is also replaced by a substrate 110 having a spherical indentation 112 in its lower face. A ball 114 is positioned between the spring 104 and the substrate 25 so as to be received into the spherical cup 108 and the indentation 112.

In the embodiment 100, the spring-loaded ball 114 urges the detector 110 against the medial lens portion 35 and also allows the substrate 108 and detector 22 to rotate on the surface of the ball 114 to align the detector face 40 and the medial lens portion 35. In other embodiments of the invention, the spherical surface of the ball 114 could be integral with the spring 104, i.e., the ball 114 could be replaced by a spherical surface defined by the spring 104.

Figure 5:
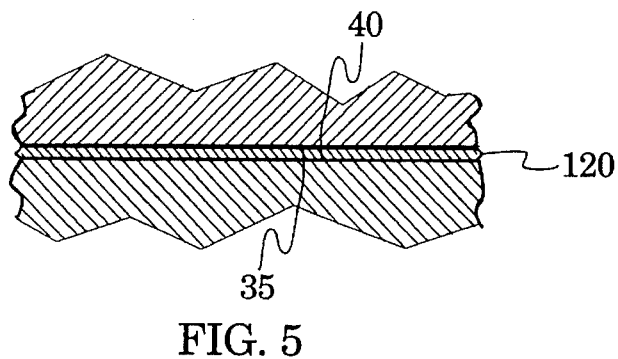
FIG. 5 is an enlarged view of the structure within the curved line 5 of FIG. 4.

It is advantageous to position an insulating layer between the lens and the detector to prevent noise caused by electrical current flow between these elements. This layer, however, must be thin enough to be optically, i.e., refractively, insignificant. Accordingly, FIG. 5 is an enlarged view of the structure within the curved line 5 of FIG. 4 that illustrates an insulating layer 120 separating the medial lens portion 25 and the detector face 40. The material of the dielectric layer 120 is preferably transparent to the radiation being detected. For infrared radiation, a satisfactorily transparent insulator is zinc sulfide (ZnS), which may be thermally evaporated onto either the lens or the detector surface or both.

Because most insulating layers will have a lower refractive index, e.g., 2.2 for ZnS, the insulating layer 120 must be thin enough to not play any significant part in the refraction of radiation across the boundary between the lens 22 and the detector 40. If the layer 120 thickness is on the order of ½ of a wavelength or less and, more preferably, on the order of ¹⁄₁₀ of a wavelength or less, the internal reflection due to the layer 120 is said to be "frustrated", i.e., the majority of the radiation energy is coupled past the layer 120 into the detector 22. As a most preferred example, 10 micron radiation has a wavelength of $10/n_l=10/4=2.5$ microns in a germanium lens, so that the insulating layer 120 should be thinner than 0.25 microns if its internal reflection contribution is to be substantially frustrated.

For the same reason, the finish on the medial lens portion 35 and the detector face 40 should be smooth and flat enough to reduce any gaps between these surfaces to the order of 0.25 microns or less. A lens and a detector arranged to have such a mutual surface relationship may be said to be in optical contact.

An exemplary immersed detector in accordance with embodiment 20 of FIGS. 1–3 was fabricated and tested. The immersed detector included a photoconductor that was formed from HgCdTe and carried on a sapphire substrate, with a ZnS insulating layer between the detector and the imaging lens. In this realization, the diameter of the mount 26 in FIG. 1 was approximately 4.4 centimeters and the distance from the mount face 64 to the top of the lens 23 was approximately 2 centimeters. The detector was illuminated with 10.6 micron wavelength radiation from a $CO_2$ laser and the optical gain versus angle of incidence was measured. In a first test, the insulating ZnS layer was 1 micron thick and in a second test the layer was 0.2 micron thick. The theoretical optical gain compared to an unimaged detector, i.e., one without an imaging lens, was calculated.

Figure 6:
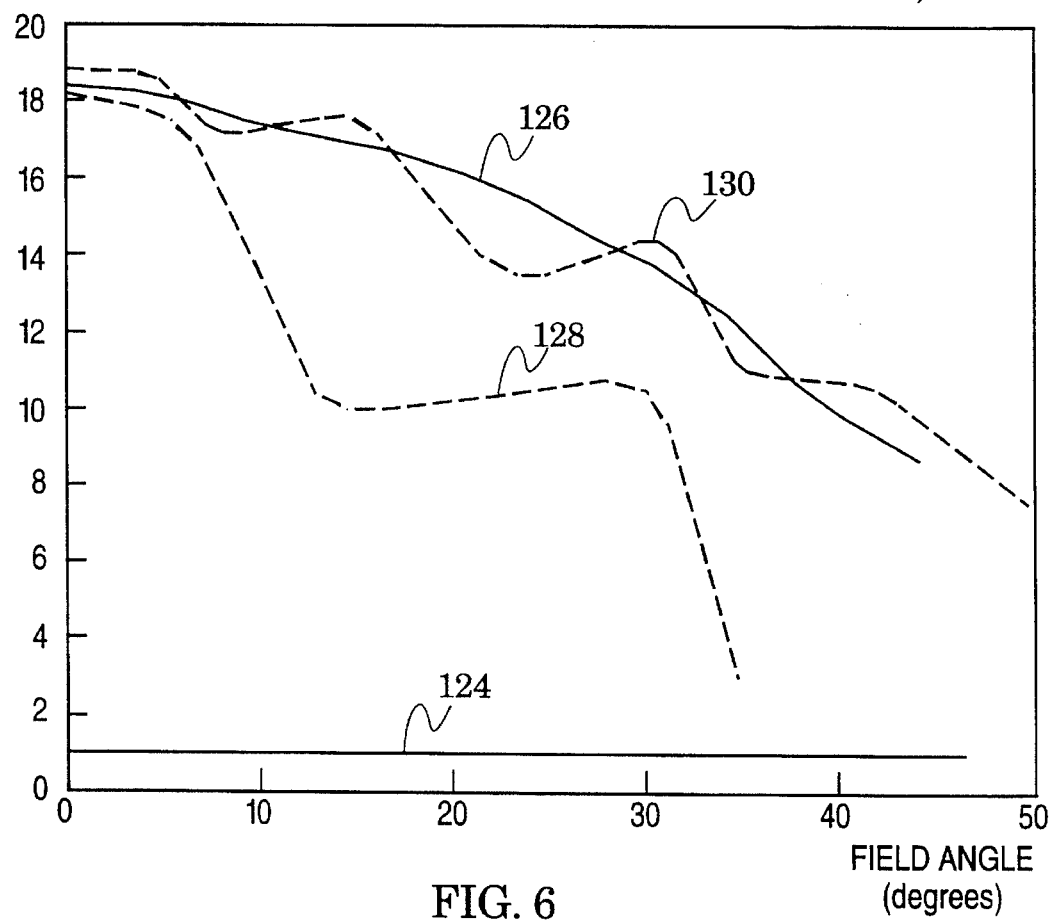
FIG. 6 is a graph of measured optical gain of an exemplary immersed photodetector constructed in accordance with the present invention.

The results are plotted in the graph 122 of FIG. 6, in which the line 124 represents the optical response of a bare detector, curve 126 is the calculated theoretical gain, curve 128 is the measured relative gain with a 1 micron insulating layer, and curve 130 is the measured relative gain with a 0.2 micron insulating layer. The measurements indicate that an immersed detector with a 0.2 micron insulating layer approached the theoretical limit. The ripples in the measured gain are caused by optical interference effects.

Because photoconductors dissipate appreciable heat, the spring 24 of FIG. 1 and the spring 104 and the ball 114 of FIG. 4 are preferably formed from a material having a high thermal conductivity, e.g., beryllium copper, and are dimensioned with a cross sectional area sufficient to transport heat readily to the surrounding mount 26.

Although the preferred embodiments have been described with reference to the optical immersion of a photoconductive detector to a germanium lens, the teachings of the invention apply to the optical immersion of any semiconductor photodetector, e.g., photoconductors, photodiodes, avalanche photodiodes, to a lens formed from any material that is generally transparent at the radiation wavelength to be detected, and which preferably has a refractive index on the order of the semiconductor's refractive index.

In the preferred embodiments, the imaging lens 23 is secured within a mount recess 28 with a suitable adhesive 32. However, other embodiments of the invention may use any of the numerous lens securement techniques that are well known in the optical art.

The preferred embodiments of the invention described herein are exemplary and numerous modifications, dimensional variations and rearrangements can be readily envisioned to achieve an equivalent result, all of which are intended to be embraced within the scope of the appended claims.

We claim:

1. An optically-immersed, semiconductor photodetector system, comprising:
   a semiconductor photodetector;
   a substrate carrying said photodetector;
   a lens;
   a resilient spring defining a convex surface, said spring being arranged to act against said substrate with said convex surface; and
   a support structure supporting said spring to urge said photodetector and said lens into optical contact with each other.

2. The system of claim 1, wherein said photodetector is configured to be sensitive to a range of radiation wavelengths, and further including an insulating dielectric positioned between said lens and said photodetector, said dielectric having a thickness less than $\frac{1}{5}$ of any wavelength in said range.

3. The system of claim 2, wherein said dielectric has a thickness less than $\frac{1}{10}$ of any wavelength in said range.

4. The system of claim 1, wherein said spring defines a spherical surface and is arranged to abut said substrate with said spherical surface.

5. An optically-immersed, semiconductor photodetector system comprising:
   a semiconductor photodetector;
   a substrate carrying said photodetector;
   a lens;
   a resilient spring acting against said substrate;
   a ball positioned between said substrate and said spring
   a support structure supporting said spring wherein said spring urges said ball to abut said substrate so that said photodetector and said lens are urged into optical contact with each other.

6. The system of claim 5, wherein said substrate defines an indentation to rotatably receive said ball.

7. The system of claim 5, wherein said spring defines a cup to rotatably receive said ball.

8. An optically-immersed, semiconductor photodetector system, comprising:
   a semiconductor photodetector;
   a substrate carrying said photodetector;
   a plano-convex lens;
   a mount carrying said plano-convex lens; and
   a resilient spring attached to said mount and urging said substrate towards the plano surface of said plano-convex lens to hold said photodetector in optical contact with said plano surface wherein said spring defines a convex surface and is arranged to abut said substrate with said convex surface.

9. The system of claim 8, wherein said photodetector is sensitive to a range of radiation wavelengths, and further including an insulating dielectric positioned between said lens and and said photodetector, said dielectric having a thickness less than $\frac{1}{2}$ of any wavelength in said range.

10. The system of claim 9, wherein said dielectric has a thickness less than $\frac{1}{10}$ of any wavelength in said range.

11. The system of claim 8, wherein said spring defines a spherical surface and is arranged to abut said substrate with said spherical surface.

12. An optically-immersed, semiconductor photodetector system comprising:
   a semiconductor photodetector;
   a substrate carrying said photodetector;
   a plano-convex lens;
   a mount carrying said piano-convex lens; and
   a resilient spring attached to said mount; and
   a ball positioned between said substrate and said spring, wherein said spring urges said ball to abut said substrate in order to urge said substrate towards the piano surface of said plano-convex lens to hold said photodetector in optical contact with said plano surface.

13. The system of claim 12, wherein said substrate defines an indentation to rotatably receive said ball.

14. The system of claim 12, wherein said spring defines a cup to rotatably receive said ball.

15. A method of optically immersing a semiconductor photodetector to a lens, comprising the steps of:
   carrying said photodetector on a supportive substrate;
   abutting said substrate with a spring defining a convex surface to facilitate alignment between said photodetector and said lens; and
   urging said substrate with the restoring force of said spring to place said detector and said lens in optical contact with each other.

16. The method of claim 15, wherein said urging step includes the step of abutting said substrate with a spherical surface to facilitate alignment between said detector and said lens.

17. The method of claim 15, further including the step of spacing said photodetector from said lens with a dielectric having a thickness less than $1/5$ of any radiation wavelength detected by said photodetector.

18. The method of claim 15, further including the step of spacing said photodetector from said lens with a dielectric having a thickness less than $1/10$ of any radiation wavelength detected by said photodetector.

* * * * *